No. 825,802. PATENTED JULY 10, 1906.
E. C. BILLINGS.
NUT LOCK.
APPLICATION FILED AUG. 21, 1905.
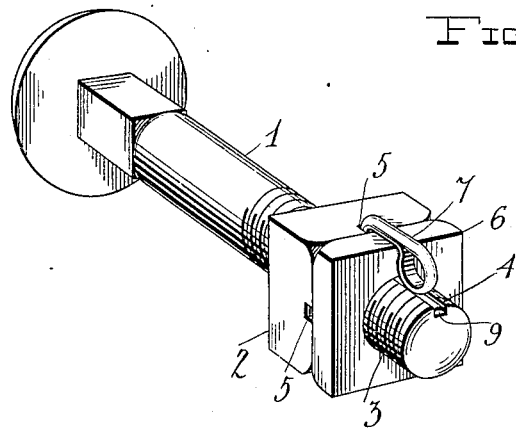
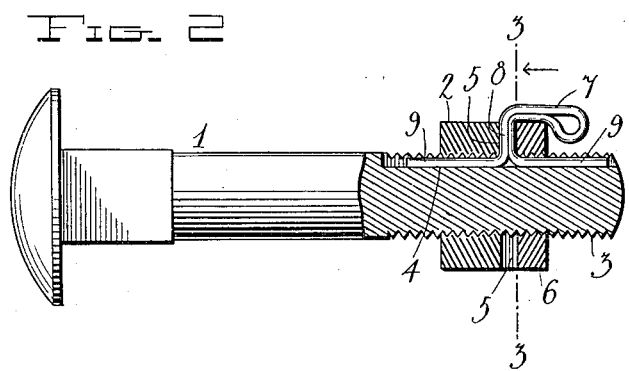
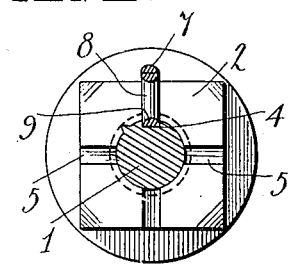
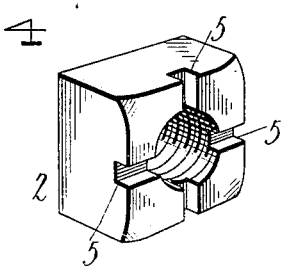
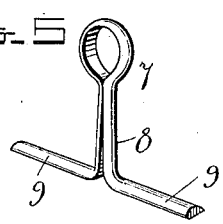
Witnesses
Inventor
E. C. Billings
by H. B. Wilson
Attorney

UNITED STATES PATENT OFFICE.

ERASTUS COWLES BILLINGS, OF GREENFIELD, MASSACHUSETTS.

NUT-LOCK.

No. 825,802.   Specification of Letters Patent.   Patented July 10, 1906.

Application filed August 21, 1905. Serial No. 275,074.

*To all whom it may concern:*

Be it known that I, ERASTUS COWLES BILLINGS, a citizen of the United States, residing at Greenfield, in the county of Franklin and State of Massachusetts, have invented certain new and useful Improvements in Nut-Locks; and I do declare the following to be a full, clear, and exact description of the invention, such as will enable others skilled in the art to which it appertains to make and use the same.

My invention relates to improvements in nut-locks of that class in which the nut is locked to the bolt; and it consists in the novel construction, combination, and arrangement of devices hereinafter described and claimed.

The object of the invention is to provide a simple, durable, and comparatively inexpensive device of this character by means of which nuts may be quickly and easily locked upon their bolts.

The above and other objects, which will appear as the nature of my invention is better understood, are accomplished by means of the construction illustrated in the accompanying drawings, in which—

Figure 1 is a perspective view of a bolt and nut with my improved locking means applied thereto. Fig. 2 is a longitudinal sectional view through the same. Fig. 3 is a transverse sectional view taken on the line 3 3 in Fig. 2. Fig. 4 is a perspective view of the nut, and Fig. 5 is a similar view of the locking-pin.

Referring to the drawings by numerals, 1 denotes a bolt, and 2 a nut, which is locked thereon by my improved locking means. The bolt 1, which may be of any desired construction, has formed in its screw-threaded end 3 a longitudinally-extending groove or channel 4, and the nut 2 has its outer face formed with transversely-extending grooves or notches 5. These grooves or notches are preferably arranged centrally, so that they intersect each other and the threaded opening of the nut. The nut is locked upon the bolt by means of an auxiliary nut or plate 6 and a cotter-pin or locking-pin 7. The locking nut or plate 6 may be of any desired form; but I preferably employ a comparatively thin nut, which may be screwed upon the threaded end of the bolt against the outer notched face of the nut 2. The locking-pin 7 is preferably in the form of a cotter-pin, as shown; but it may be of any other desired form and construction, so that it has a portion 8 adapted to seat in one of the notches 5 and one or more angularly-extending portions 9, adapted to seat in the longitudinal groove 4 of the bolt 1. The pin is preferably of T form, as shown in Fig. 5 of the drawings, and is adapted to lock the nut against rotary movement by the engagement of its oppositely-projecting ends or portions 9 with the groove 4 in the bolt and by the engagement of its end 8 with the nut 6, said end being bent into engagement with said locking-nut, as shown in Figs. 1 and 2 of the drawings, when it is desired to lock said parts.

The construction, use, and advantages of the invention will be readily understood from the foregoing description, taken in connection with the accompanying drawings. It will be seen that in locking the nut the latter is screwed upon the bolt to the desired extent and then turned so that one of the notches or grooves 5 alines with the groove 4 in the bolt. The locking or cotter pin is then applied so that its portions 9 are seated in the groove 4 and its portion 8 in the alining groove or notch 5. The locking-nut 6 is then screwed down against the outer face of the nut 2, and the end 8 of the locking-pin is bent over the locking-nut 6, as shown. The device is simple, durable, and reliable, and by means of it a nut may be quickly locked to or unlocked from the bolt.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described nut-lock consisting of a bolt having a longitudinally-extending groove 9 in the threaded portion thereof, a nut having centrally-disposed intersecting transverse grooves 5 in its outer face, a locking-nut screwed upon said bolt into engagement with the outer face of the first-mentioned nut, and a split key 7 formed of a half-round wire having its bent oppositely-projecting ends seated in the groove 9 in the bolt and its doubled portion seated in one of the grooves 5 in said nut and bent over into engagement with said locking-nut, essentially as described.

In testimony whereof I have hereunto set my hand in presence of two subscribing witnesses.

ERASTUS COWLES BILLINGS.

Witnesses:
CHARLES N. STODDARD,
GEORGE K. POND.